UNITED STATES PATENT OFFICE 1,950,671

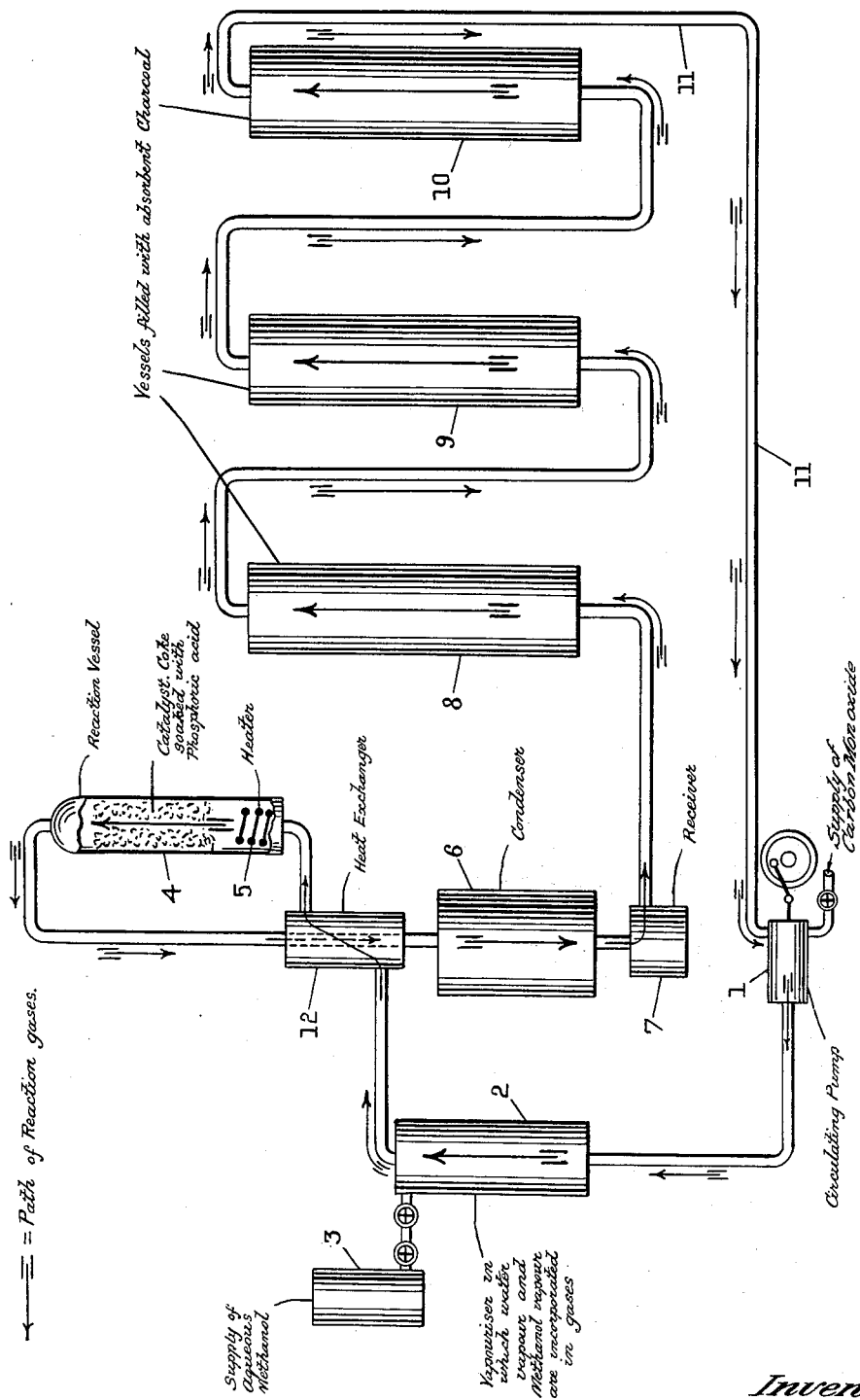

MANUFACTURE OF OXYGENATED ORGANIC COMPOUNDS

Stanley Joseph Green and Roy Handley, Spondon, near Derby, England, assignors to Celanese Corporation of America, a corporation of Delaware Application April 2, 1930, Serial No. 441,012
In Great Britain May 27, 1929

16 Claims. (Cl. 260—116)

This invention relates to processes for the manufacture of oxygenated organic compounds from mixtures of gases or vapours comprising carbon monoxide.

As examples of such processes, we refer to the production of oxygenated organic compounds by subjecting to the action of heated catalysts, mixtures of carbon monoxide and hydrogen, or mixtures of carbon monoxide (or carbon monoxide and hydrogen) with vapours of aliphatic alcohols, esters or ethers.

In practice the compounds are usually produced by circulating the reaction gases repeatedly over the catalyst in a closed circuit which is usually maintained under pressure.

We have found that when passing the reaction gases or vapours repeatedly over the catalyst quantities of undesired condensation products such for instance as paraffin hydrocarbons are often produced which cause difficulties in operation. For instance the quantity of such condensation products is liable to increase to such quantity as to dilute to an undesirable extent the gases or vapours being circulated, often necessitating wasteful replacements of the reaction gas or vapour in circulation; and, for instance, more highly condensed bodies such as higher hydrocarbons are liable to be formed and become condensed with the products of reaction thereby contaminating the reaction products.

According to the invention we have now found that these undesired condensation products can be effectively separated by absorption from the reaction gases, and for this purpose we cause the reaction gases to pass through or over a substance capable of absorbing paraffin hydrocarbons or other gaseous or vaporous substances (for example absorbent charcoal or active carbon or silica gel) prior to circulating them through the reaction zone.

We preferably pass the reaction gases through a condenser to separate liquefiable reaction products prior to passing the reaction vapours through or over the absorptive charcoal or active carbon, silica gel or other absorbent. Thus for instance we may employ a closed circuit and cause the reaction gas to pass from the reaction vessel to a condenser (wherein the liquid reaction products are separated) and from thence through one or more towers or vessels filled with the absorbent (e. g. charcoal or active carbon or silica gel), from which towers or vessels the reaction gas is caused to pass again to the reaction vessel.

In performing the invention we may employ any catalysts, temperatures and pressures known to promote the synthesis of the particular oxygenated organic compound or compounds. Likewise we may employ any gas mixtures containing carbon monoxide which are applicable for the particular synthesis, for instance we may employ mixtures of carbon monoxide and hydrogen (or industrial gases containing such mixtures) or mixtures of carbon monoxide (or of carbon monoxide and hydrogen) with methanol, methylacetate, methyl formate or dimethylether.

The manufacture of acetic acid from methanol and carbon monoxide (or a mixture of carbon monoxide and hydrogen) in presence of an inorganic acid such as phosphoric acid may be mentioned as a highly useful application of the invention. In such manufacture the reaction is usually performed by circulating the gas mixture under pressure through the catalyst in a closed system of apparatus and it is found that repeated circulation of the gas mixture results in the formation of considerable quantities of undesired reaction products such for instance as paraffin hydrocarbons which dilute the gas mixture to an undesirable extent and, sometimes appear as oily products in the liquid reaction products. By causing the reaction gases after condensation of liquid reaction products to traverse a vessel or tower filled with absorbent or active carbon or silica gel (or other absorbent of the character referred to) after leaving the reaction zone and prior to being recirculated, these difficulties are largely or entirely eliminated.

According to one convenient form of such application of the invention we may provide a closed system of apparatus comprising a gas circulating pump which drives the carbon monoxide (or gas mixture containing the same) first through a mixing chamber where methylalcohol or aqueous methylalcohol may be incorporated in the form of vapour. The resulting gas mixture passes thence through a heat exchanger into the reaction chamber containing the catalyst, for instance phosphoric acid. The products issuing from the reaction chamber pass through the heat exchanger to a condenser provided with a receiver, in which uncondensable gases are separated from liquid products. The gases pass thence through one or more vessels or towers filled or provided with absorbent or active carbon or silica gel or other absorbent of the character referred to and are returned from thence to the gas circulating pump.

The accompanying diagrammatic drawing serves to illustrate such form of execution of the invention.

Referring to the drawing, 1 is the gas circulating pump which circulates the carbon monoxide (or gas containing the same) through the apparatus. 2 is the mixing chamber in which the vapour of aqueous methanol is incorporated in the gases, this chamber being supplied to the vessel 3 and being heated in any convenient manner, e. g. by steam. 4 is the reaction vessel which is provided with a catalyst (coke soaked in phosphoric acid), this vessel being provided with an electric heater 5 for heating the reaction gases or controlling their temperature. 6 is a condenser separating the liquefiable products of reaction from the reaction gases. 8, 9 and 10 are the vessels or towers filled with active charcoal.

In operation the carbon monoxide (or gas containing the same) passes from the pump 1 under the desired pressure (e. g. 100–150 atmospheres) to the mixing chamber 2 wherein the gases become charged with the desired proportion of vapours of methanol and water. The resulting mixture passes from the chamber 2 to the reaction vessel 4 via the heat exchanger 12. In its passage through the heat exchanger 12 the mixture is preheated by the hot reaction gases leaving the reaction vessel 4. The mixture on entering the vessel 4 passes first through the electric heater 5 which supplies as much heat as is necessary to bring the mixture to the desired reaction temperature (e. g. 300–350° C.), wherein the mixture passes through the catalyst, which catalyst is maintained at the desired reaction temperature (e. g. 300–400° C.) by any convenient means. The reaction gases leave the reaction vessel 4 and pass thence via the heat exchanger 12 to the condenser 6, wherein liquefiable reaction products are separated, these liquefiable reaction products collecting in the receiver 7. From the condenser 6 and receiver 7 the uncondensed gases pass successively through the vessels or towers 8, 9 and 10, wherein any paraffin hydrocarbons or vaporous products are absorbed from the gases by the absorbent charcoal. After leaving the vessel or tower 10 the gases return by the pipe 11 to the pump 1 for recirculation through the system.

What we claim and desire to secure by Letters Patent is:

1. Process for the manufacture of oxygenated organic compounds from mixtures of gases or vapors comprising carbon monoxide and a substance selected from the group consisting of hydrogen, and aliphatic alcohols, esters and ethers, comprising cyclically circulating the gases or vapors comprising carbon monoxide through a heated reaction zone containing at least one catalyst, and causing the reaction vapors, after passing through the reaction zone and prior to being returned to the reaction zone, to pass in contact with gas-absorbing substance capable of absorbing paraffin hydrocarbons.

2. Process for the manufacture of acetic acid from gaseous or vaporous mixtures comprising methanol and carbon monoxide, comprising cyclically circulating the said mixtures under pressure through a heated reaction zone containing at least one catalyst, and causing the reaction vapors, after passing through the reaction zone and a condensation of the liquefiable reaction products and prior to being returned to the reaction zone, to pass in contact with gas-absorbing substance capable of absorbing paraffin hydrocarbons.

3. Process for the manufacture of acetic acid from gaseous or vaporous mixtures comprising methanol and carbon monoxide, comprising cyclically circulating said mixtures under pressure through a heated reaction zone containing phosphoric acid, and causing the reaction vapors, after passing through the reaction zone and a condensation of the liquefiable reaction products and prior to being returned to the reaction zone, to pass in contact with gas-absorbing substance capable of absorbing paraffin hydrocarbons.

4. Process for the manufacture of oxygenated organic compounds from mixtures of gases or vapors comprising carbon monoxide and a substance elected from the group consisting of hydrogen, and aliphatic alcohols, esters and ethers comprising cyclically circulating vapors through a heated reaction zone containing at least one catalyst, and causing the reaction vapors, after passing through the reaction zone and a condensation of the liquefiable reaction products and prior to being returned to the reaction zone, to pass in contact with a solid absorbent material capable of absorbing paraffin hydrocarbons.

5. Process for the manufacture of acetic acid from gaseous or vaporous mixtures comprising methanol and carbon monoxide, comprising cyclically circulating the said mixtures under pressure through a heated reaction zone containing at least one catalyst, and causing the reaction vapors, after passing through the reaction zone and a condensation of the liquefiable reaction products and prior to being returned to the reaction zone, to pass in contact with a solid absorbent material capable of absorbing paraffin hydrocarbons.

6. Process for the manufacture of acetic acid from gaseous or vaporous mixtures comprising methanol and carbon monoxide, comprising cyclically circulating the said mixtures under pressure through a heated reaction zone containing phosphoric acid, and causing the reaction vapors, after passing through the reaction zone and a condensation of the liquefiable reaction products and prior to being returned to the reaction zone, to pass in contact with a substance selected from the group consisting of absorbent charcoal, activated charcoal, silica gel.

7. Process for the manufacture of oxygenated organic compounds from mixtures of gases or vapors comprising carbon monoxide and a substance selected from the group consisting of hydrogen, and aliphatic alcohols, esters and ethers, comprising cyclically circulating the gases or vapors through a heated reaction zone containing at least one catalyst, causing the reaction vapors, after passing through the reaction zone, to pass successively through a condenser to separate liquefiable reaction products, and then into contact with gas-absorbing substance, capable of absorbing paraffin hydrocarbons and thereafter returning the gas to the reaction zone.

8. Process for the manufacture of acetic acid from gaseous or vaporous mixtures comprising methanol and carbon monoxide, comprising cyclically circulating the said mixtures under pressure through a heated reaction zone containing at least one catalyst, causing the reaction vapors, after passing through the reaction zone, to pass successively through a condenser to separate liquefiable reaction products, and then into contact with gas-absorbing substance, capable of absorbing paraffin hydrocarbons and thereafter returning the gas to the reaction zone.

9. Process for the manufacture of acetic acid from gaseous or vaporous mixtures comprising methanol and carbon monoxide, comprising cyclically circulating the said mixtures under pressure through a heated reaction zone containing phosphoric acid, causing the reaction vapors, after passing through the reaction zone, to pass successively through a condenser to separate liquefiable reaction products, and then into contact with gas absorbing substance, capable of absorbing paraffin hydrocarbons and thereafter returning the gas to the reaction zone.

10. Process for the manufacture of oxygenated organic compounds from mixtures of gases or vapors comprising carbon monoxide and a substance selected from the group consisting of hydrogen, and aliphatic alcohols, esters and ethers, comprising cyclically circulating the gases or vapors through a heated reaction zone containing at least one catalyst, causing the reaction vapors, after passing through the reaction zone, to pass successively through a condenser to separate liquefiable reaction products, and then into contact with a substance selected from the group consisting of absorbent charcoal, activated charcoal, silica gel, and thereafter returning the gas to the reaction zone.

11. Process for the manufacture of acetic acid from gaseous or vaporous mixtures comprising methanol and carbon monoxide, comprising cyclically circulating the said mixtures under pressure through a heated reaction zone containing at least one catalyst, causing the reaction vapors, after passing through the recation zone, to pass successively through a condenser to separate liquefiable reaction products, and then into contact with a substance selected from the group consisting of absorbent charcoal, activated charcoal, silica gel, and thereafter returning the gas to the reaction zone.

12. Process for the manufacture of acetic acid from gaseous or vaporous mixtures comprising methanol and carbon monoxide, comprising cyclically circulating said mixtures under pressure through a heated reaction zone containing phosphoric acid, causing the reaction vapors, after passing through the reaction zone, to pass successively through a condenser to separate liquefiable reaction products, and then into contact with a substance selected from the group consisting of absorbent charcoal, activated charcoal, silica gel, and thereafter returning the gas to the reaction zone.

13. In a process for the manufacture of oxygenated organic compounds from mixtures of gases or vapors comprising carbon monoxide and a substance selected from the group consisting of hydrogen, and aliphatic alcohols, esters and ethers and wherein the gases or vapors are repeatedly circulated through a heated reaction zone containing at least one catalyst, the step of removing gaseous by-products from the reaction gases subsequent to their leaving the reaction zone and prior to their recirculation through the reaction zone.

14. In a process for the manufacture of oxygenated organic compounds from mixtures of gases or vapors comprising carbon monoxide and a substance selected from the group consisting of hydrogen, and aliphatic alcohols, esters and ethers and wherein the gases or vapors are repeatedly circulated through a heated reaction zone containing at least one catalyst, the step of removing paraffin hydrocarbons from the reaction gases subsequent to their leaving the reaction zone and prior to their recirculation through the reaction zone.

15. In a process for the manufacture of acetic acid from vaporous mixtures comprising methanol and carbon monoxide and wherein said vaporous mixtures are repeatedly circulated under pressure through a heated reaction zone containing at least one catalyst, the step of removing gaseous by-products from the reaction gases subsequent to their leaving the reaction zone and prior to their recirculation through said zone.

16. In a process for the manufacture of acetic acid from vaporous mixtures comprising methanol and carbon monoxide and wherein said vaporous mixtures are repeatedly circulated under pressure through a heated reaction zone containing at least one catalyst, the step of removing paraffin hydrocarbons from the reaction gases subsequent to their leaving the reaction zone and prior to their recirculation through said zone.

STANLEY JOSEPH GREEN.
ROY HANDLEY.